US011599261B2

United States Patent
Hirabe

(10) Patent No.: US 11,599,261 B2
(45) Date of Patent: Mar. 7, 2023

(54) DISPLAY APPARATUS THAT DISPLAYS MARKER ON POSITION OF TARGET CHARACTER AND DISPLAYS NEXT MARKER ACCORDING TO SLIDE OPERATION

(71) Applicant: KYOCERA Document Solutions Inc., Osaka (JP)

(72) Inventor: Masato Hirabe, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/442,418

(22) PCT Filed: Jan. 30, 2020

(86) PCT No.: PCT/JP2020/003390
§ 371 (c)(1),
(2) Date: Sep. 23, 2021

(87) PCT Pub. No.: WO2020/202755
PCT Pub. Date: Oct. 8, 2020

(65) Prior Publication Data
US 2022/0187982 A1 Jun. 16, 2022

(30) Foreign Application Priority Data
Apr. 3, 2019 (JP) .............................. JP2019-071470

(51) Int. Cl.
*G06F 3/04855* (2022.01)
*G06F 16/93* (2019.01)
(Continued)

(52) U.S. Cl.
CPC ........ *G06F 3/04855* (2013.01); *G06F 3/0485* (2013.01); *G06F 3/0488* (2013.01);
(Continued)

(58) Field of Classification Search
CPC ............... G06F 3/04855; G06F 3/0488; G06F 16/90344; G06F 16/9038; G06F 16/93;
(Continued)

(56) References Cited

U.S. PATENT DOCUMENTS 8,386,965 B2 * 2/2013 Fleizach ............. G06F 3/04883
715/708
9,542,091 B2 * 1/2017 Missig ................ G06F 3/04842
(Continued)

FOREIGN PATENT DOCUMENTS

| JP | 2010-152874 A | | 7/2010 | |
|---|---|---|---|---|
| JP | 2012174100 A | * | 9/2012 | |
| KR | 2018028434 A | * | 3/2018 | ....... G06F 17/30525 |

*Primary Examiner* — Kieu D Vu
*Assistant Examiner* — Blaine T Basom
(74) *Attorney, Agent, or Firm* — IP Business Solutions, LLC

(57) ABSTRACT

A display apparatus (1) includes a searcher (105) that searches document data displayed on a display device (10) for a target character that accords with a character to search, and a marker display controller (106) that displays a marker on a position corresponding to the target character detected by the searcher (105). A display controller (103) (i) causes the display device, when a slide operation is performed on the marker displayed on the display device (10), to display a next marker on an opposite side, in a direction of the slide operation, and (ii) causes the display device, when a slide operation is performed on a position other than the marker displayed on the display device (10), to scroll a screen on the display device (10) in the direction of the slide operation.

6 Claims, 15 Drawing Sheets

(51) Int. Cl.
*G06F 16/9038* (2019.01)
*G06F 16/903* (2019.01)
*G06F 3/0488* (2022.01)
*G06F 3/0485* (2022.01)

(52) U.S. Cl.
CPC .... *G06F 16/9038* (2019.01); *G06F 16/90344* (2019.01); *G06F 16/93* (2019.01); *G06F 2203/04808* (2013.01)

(58) Field of Classification Search
CPC ........ G06F 2203/04808; G06F 3/0485; G09G 5/00; G09G 5/02; G09G 5/34; G09G 5/36
See application file for complete search history.

(56) References Cited

U.S. PATENT DOCUMENTS

| | | | |
|---|---|---|---|
| 11,334,243 B2* | 5/2022 | Yoshikawa | G06F 3/04842 |
| 2009/0222423 A1* | 9/2009 | Haruta | G06F 3/0485 |
| | | | 707/E17.061 |
| 2010/0037183 A1* | 2/2010 | Miyashita | G06F 3/04883 |
| | | | 345/173 |
| 2011/0234601 A1 | 9/2011 | Yasuta et al. | |
| 2013/0104074 A1* | 4/2013 | Takahashi | G06F 3/0488 |
| | | | 715/784 |
| 2013/0211842 A1* | 8/2013 | Edgar | G06F 3/167 |
| | | | 704/275 |
| 2014/0033095 A1* | 1/2014 | Koba | G06F 3/0488 |
| | | | 715/765 |
| 2014/0096074 A1* | 4/2014 | Dojo | G06F 3/0418 |
| | | | 715/788 |
| 2014/0192004 A1* | 7/2014 | Andersson | G06F 3/041 |
| | | | 345/173 |
| 2015/0074521 A1* | 3/2015 | Bendig | G06F 16/93 |
| | | | 715/256 |
| 2015/0220979 A1* | 8/2015 | Ouimet | G06Q 30/0633 |
| | | | 705/14.49 |
| 2016/0092017 A1* | 3/2016 | Bates | G06F 3/0485 |
| | | | 345/173 |
| 2016/0274761 A1* | 9/2016 | Alonso Ruiz | G06F 3/016 |

* cited by examiner

DISPLAY APPARATUS THAT DISPLAYS MARKER ON POSITION OF TARGET CHARACTER AND DISPLAYS NEXT MARKER ACCORDING TO SLIDE OPERATION

TECHNICAL FIELD

The present invention relates to a display apparatus, and in particular to a technique to search document data displayed on a screen.

BACKGROUND ART

In recent years, mobile devices such as a mobile phone, a smartphone, a personal digital assistant (PDA), and an electronic tablet, have come to be widely used. The mobile device includes a touch panel provided over a screen of a display device, to receive a user's operation (touch operation, inputting of character, and so forth) performed on the screen of the display device, through the touch panel, and to respond to the user's operation.

When the mobile device receives, while document data is displayed on the screen of the display device, the user's operation including an input of a character to search in a search field displayed on the screen, and an instruction to start the search, through the touch panel, the mobile device executes the search of the character to search. Upon detecting a target character that accords with the character to search (i.e., matching character) in the document data, the mobile device highlights the position of the matching character, in the document data. When the matching character is found at a plurality of positions, each of the plurality of positions is highlighted.

CITATION LIST

Patent Literature

PTL 1: Japanese Unexamined Patent Application Publication No. 2010-152874

SUMMARY OF INVENTION

Technical Problem

With the electronic device according to PTL 1 cited above, however, when the user presses a next button or a previous button prepared in advance on the screen, while the matching character is highlighted in the document data, the highlighted position of the matching character is shifted to the next or the previous position of the matching character. In other words, the user has to shift the visual line between the position of the matching character and the search button, because the user is unable to operate the search button, keeping his/her eyes on the matching character. Therefore, performing the character search in the document data may constitute a burden on the user.

In addition, to scroll the screen of the display device, the user has to operate a scroll bar displayed on the display device. Therefore, the user has to shift the visual line between the position of the matching character and the scroll bar, when operating the scroll bar, which impairs the convenience in operating the screen.

The present invention has been accomplished in view of the foregoing situation, and provides a technique to alleviate the burden on the user in the character search of document data, and to improve the convenience in operating the screen.

Solution to Problem

In an aspect, the present invention provides a display apparatus including a display device, a touch panel that detects whether a contact has been made on the display device, and also a contact position, the touch panel being located on a front face of the display device, an operation receiver that receives an instruction according to a touch operation performed on the display device and detected by the touch panel, a document data memory in which document data is stored, a display controller that causes the display device to display the document data stored in the document data memory, when the operation receiver receives an instruction to display the document data, a searcher that searches, when the operation receiver receives an input of a character to search, the document data displayed on the display device for a target character that accords with the character to search, and a marker display controller that displays a marker on a position corresponding to the target character detected by the searcher. The display controller (i) causes the display device, when the operation receiver receives an instruction based on a slide operation, performed on the marker displayed on the display device and detected by the touch panel, to display a next marker located on an opposite side, in a direction of the slide operation, and (ii) causes the display device, when the operation receiver receives an instruction based on a slide operation, performed on a position other than the marker displayed on the display device and detected by the touch panel, to scroll a screen on the display device in the direction of the slide operation.

Advantageous Effects of Invention

The mentioned arrangement according to the present invention alleviates the burden on the user in the character search of document data, and improves the convenience in operating the screen.

DESCRIPTION OF EMBODIMENTS

Figure 1:
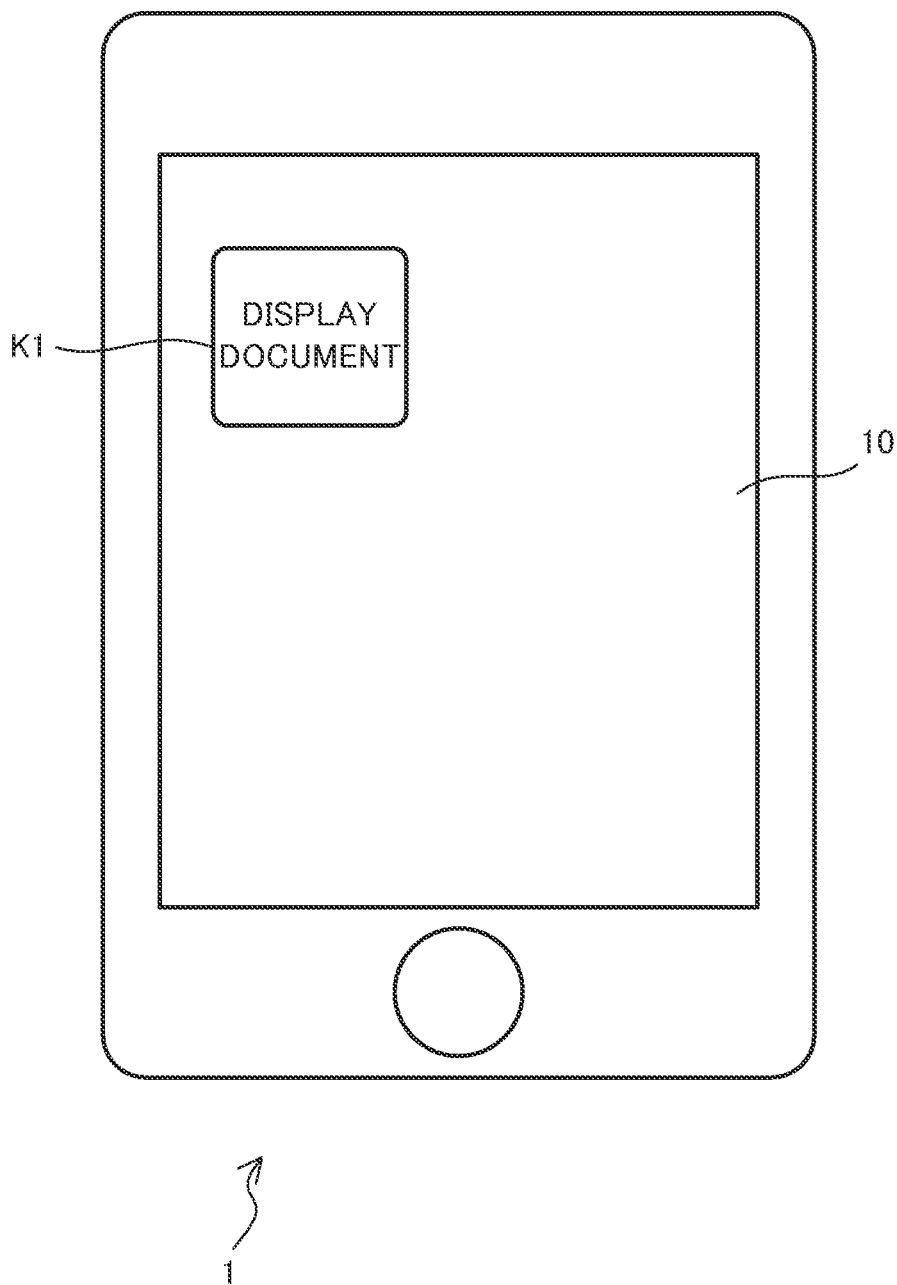
FIG. 1 is a plan view showing an appearance of a display apparatus according to a first embodiment of the present invention.
Figure 2:
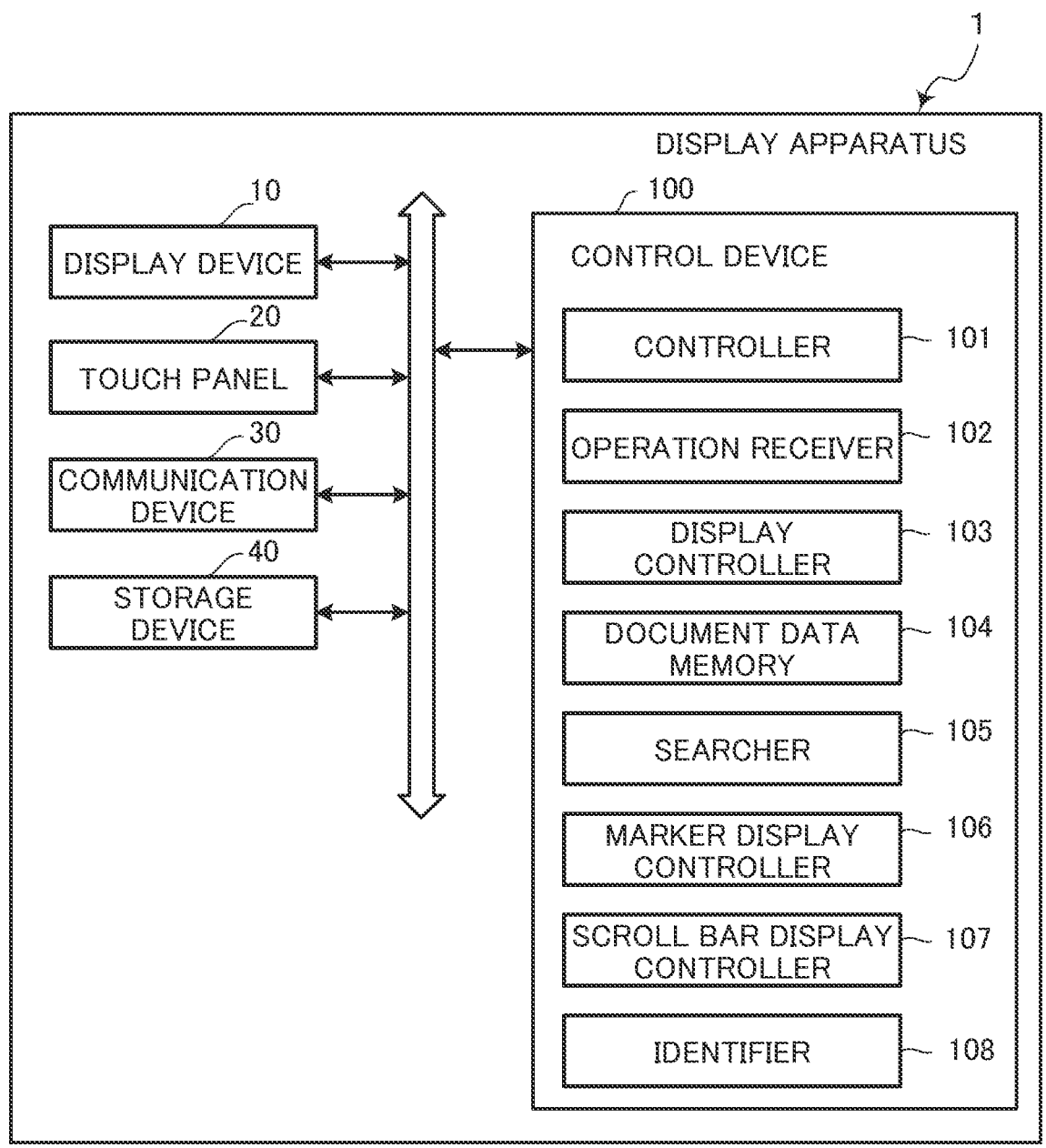
FIG. 2 is a block diagram showing an essential internal configuration of the display apparatus according to the first embodiment.

Hereafter, a display apparatus according to a first embodiment of the present invention will be described, with reference to the drawings. FIG. 1 is a plan view showing an appearance of a display apparatus according to a first embodiment of the present invention. FIG. 2 is a block diagram showing an essential internal configuration of the display apparatus according to the first embodiment.

The display apparatus 1 according to the first embodiment of the present invention is configured as a mobile device such as a smartphone, and includes a display device 10, a touch panel 20, a communication device 30, a storage device 40, and a control device 100. These components are capable of transmitting and receiving data or signals, to and from each other, for example via a central processing unit (CPU) bus.

The display device 10 is, for example, constituted of a liquid crystal display (LCD) or an organic light-emitting diode (OLED) display. The display device 10 displays responses from the control device 100 and data search results.

The touch panel 20 is based on what is known as a resistive film or electrostatic capacitance. The touch panel 20 is provided over the front face of the display device 10, and configured to detect whether a contact (pressing down) has been made by the user on the screen displayed by the display device 10, and the touched position (position pressed down) in the case where the contact has been made. Upon detecting the contact of the user, the touch panel 20 outputs a detection signal indicating the coordinate of the touched position, to the operation receiver 102 of the control device 100 to be subsequently described. Thus, the touch panel 20 serves as an operation device for the user to input instructions through the screen displayed by the display device 10.

The touch panel 20 herein referred to includes a touch panel that detects the presence of the finger, when the finger comes within a predetermined distance from the screen, though the finger has not directly touched the screen. Therefore, the term "contact" used in the description of the first embodiment encompasses the case where the touch panel 20 detects the finger that has come within the predetermined distance, though the finger has not touched the screen.

The display apparatus 1 may also include physical keys, in addition to the touch panel 20, as the operation device through which the user's operation is inputted. Examples of the physical keys include an arrow key, a page-up kay, and a page-down key.

The communication device 30 is a communication interface including a communication module such as a non-illustrated local area network (LAN) chip. The display apparatus 1 is connected to another electronic device such as a personal computer (PC) via a network, and transmits and receives data to and from the connected PC, through the communication device 30.

The storage device 40 includes memory units such as a non-volatile memory.

The control device 100 includes a processor, a random-access memory (RAM), a read-only memory (ROM), and so forth. The processor is, for example, a CPU, an MPU, or an ASIC. The control device 10 includes a controller 100. The control device 100 acts as a controller 101, an operation receiver 102, a display controller 103, a document data memory 104, a searcher 105, a marker display controller 106, a scroll bar display controller 107, and an identifier 108, when the processor executes a display control program stored in the storage device 40. Here, the cited components of the control device 100 may each be constituted in the form of a hardware circuit, instead of being realized by the operation according to the display control program. This also applies to other embodiments, unless otherwise specifically noted.

The controller 101 controls the overall operation of the display apparatus 1. The controller 101 is connected to the display device 10, the touch panel 20, the communication device 30, and the storage device 40, to control the operation of the mentioned components, and transmit and receive signals and data, to and from those components.

The operation receiver 102 receives an instruction according to a touch operation, performed on the display device 10 and detected by the touch panel 20. The operation receiver 102 identifies the type of the touch operation performed by the user, according to a detection signal outputted from the touch panel 20, and outputs the instruction corresponding to the identified type, to the controller 101 and the display controller 103.

The touch operations performed on the touch panel 20 include, for example, a tap operation and a slide operation (flick operation and swipe operation inclusive). For example, when the user touches the touch panel 20 with a finger, and then releases the finger from the contact position, the touch panel 20 outputs the detection signal indicating the position where the contact has been detected, to the operation receiver 102. Upon receipt of the detection signal, the operation receiver 102 identifies that, for example, the operation inputted by the user is a tap operation.

When the user moves the finger keeping the finger in contact with the touch panel 20, the touch panel 20 outputs the detection signal indicating the positions from the initial position, where the contact was first detected, to the final position where the contact was last detected, to the operation receiver 102. Upon receipt of the detection signal, the operation receiver 102 identifies that the operation inputted by the user is a slide operation (flick operation or swipe operation). Here, the touch panel 20 is capable of detecting a multi-touch operation, including moving a plurality of (e.g., two) fingers on the touch panel 20 in contact therewith, and simultaneously touching a plurality of points on the touch panel 20.

The display controller 103 controls the displaying operation of the display device 10. For example, when the operation receiver 102 receives an instruction to display document data from the user, the display controller 103 retrieves the document data from the document data memory 104, and causes the display device 10 to display the retrieved document data.

In the document data memory 104, document data M1 (see FIG. 3) is stored. The document data M1 is, for example, document file data such as text data, or file data for word processor. The document data M1 includes information constituting a document, such as character information (position information of each character inclusive), font (color information inclusive), paragraph setting, page setting, and embedded image, combined as a file. In the first embodiment, the document data M1 is exemplified by a report in which the characters shown in FIG. 3 are written.

Figure 3:
FIG. 3 is a schematic drawing showing an example of document data.
Figure 4:
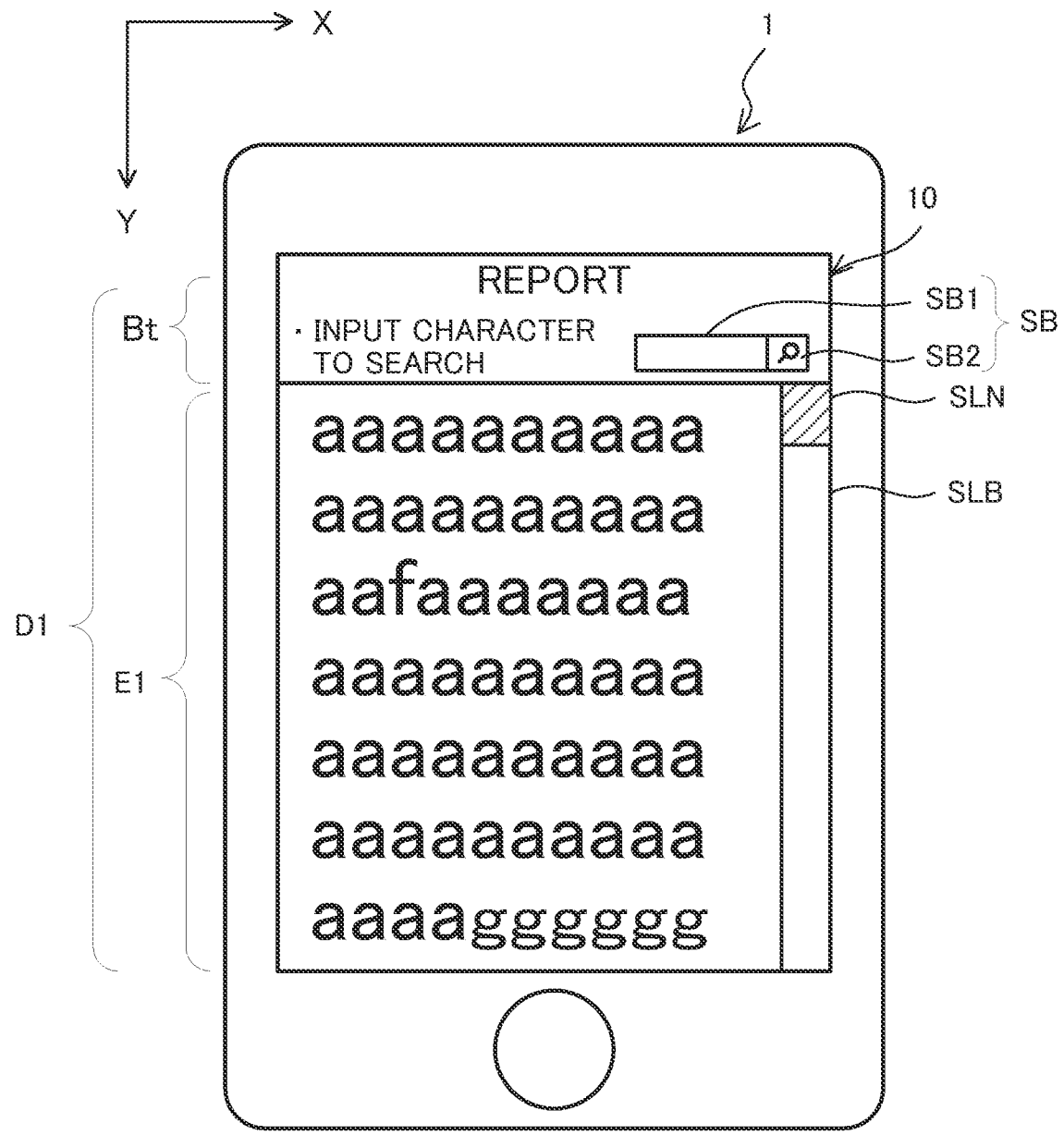
FIG. 4 is a schematic drawing showing an example of a screen displayed on a display device.

Referring to FIG. 3 and FIG. 4, a relation between the document data M1 and a screen D1 will be described hereunder. FIG. 3 illustrates an example of the document data. FIG. 4 illustrates an example of the screen displayed on the display device. The document data M1 includes n pages (n is a natural number), on which sentences of predetermined character are written, as shown in FIG. 3. Each page includes seven lines in the vertical direction (e.g., Y-direction in FIG. 3), each of which includes ten characters written horizontally (e.g., X-direction in FIG. 3), and the length in the vertical direction (e.g., Y-direction in FIG. 3) is longer than the screen D1 of the display device 10. In the document data M1 shown in FIG. 3, ten characters "aafaaaaaaa" are written on the third line from the top in the first page, ten characters "aaaaafbaaa" are written on the fourth line from the top in the second page, and ten characters "aaaaaafzaa" are written on the third line from the top in the n-th page.

When the operation receiver 102 identifies, for example, that the user's touch operation is a swipe operation, the display controller 103 scrolls the screen such that the scroll speed is gradually reduced (inertia scroll), according to the direction and speed of the swipe operation. The display controller 103 determines the scroll speed according to whether a contact has been made and the contact position, detected by the touch panel 20, and causes the display device 10 to perform scroll display of the document data M1, at the scroll speed determined as above. To be more detailed, the display controller 103 determines the direction of the swipe operation according to the detection by the touch panel 20, of the moving direction of the finger contacting the touch panel 20, and determines the speed of the swipe operation according to the travel distance of the finger per unit time. Here, although the following description refers to the case where the swipe operation has been received, the present invention may cause the operation receiver 102 and the display controller 103 to perform the control operation, on the basis of other types of touch operation, such as a flick operation.

In the first embodiment, the image to be scroll-displayed on the display device 10, under the control of the display controller 103, will be referred to as a scrollable image. More specifically, the scrollable image refers to an image the entirety of which is unable to be displayed at a time, in the display region of the display device 10, in other words an image that has to be scrolled so that a part of the image is sequentially displayed in the display region. When the document data M1 contains the character information (or image information) of a large volume as shown in FIG. 3, and therefore protrudes from a display region E1 of the display device 10, the document data M1 is handled as the scrollable image.

As shown in FIG. 4, the screen D1 includes a titlebar Bt (fixed display region) displaying the title "Report" of the document data M1, and the display region E1 (scroll display region) scroll-displaying the document data M1. A portion P1 indicated by broken lines in FIG. 3 is displayed in the display region E1 shown in FIG. 4. In the display region E1, the character information "aaaaaaaaaa" on the first line of the first page, to the character information "aaaagggggg" on the seventh line of the first page can be displayed, for example by the slide operation of the user.

The display controller 103 displays a search box SB, in which a character to search with respect to the document data M1 is to be inputted, at a predetermined position in the titlebar Bt (fixed display region) in the screen D1. The search box SB includes, as shown in FIG. 4, an input field SB1 in which a character to search is to be inputted by the user, and a search execution button SB2 for instructing the start of the search.

When the operation receiver 102 receives the input of the character to search, the searcher 105 searches the document data M1 displayed on the display device 10, for a target character that accords with the character to search.

The document data M1 includes, as shown in FIG. 3, length information indicating a length in the X-direction and the Y-direction, and position information (e.g., coordinate data) indicating the position of each character, in the X-direction and the Y-direction. The storage device 40 contains the length information indicating the length of the display region E1 of the display device 10 shown in FIG. 4, in the X-direction and the Y-direction. The searcher 105 sequentially detects target characters that accord with the character to search received by the operation receiver 102, from the document data M1 which is the file data for word processor, and also detects the position information of the target characters detected, using the position information of each character in the document data M1, stored in the storage device 40. In an example shown in FIG. 8A to be subsequently referred to, representing the case where "f" has been inputted in the input field SB1 as the character to search, the searcher 105 detects all the "f"s contained in the document data M1 shown in FIG. 3, and the position information of each "f" detected.

The marker display controller 106 displays a marker MK on a position corresponding to the target characters detected by the searcher 105. For example, the marker display controller 106 displays the marker MK of a predetermined color, on the position indicated by the position information of the target character detected by the searcher 105 (e.g., a rectangular region surrounding the target character). For example, when the position information of one of the target characters detected by the searcher 105 indicates a coordinate (X1, Y1) at the upper left corner and a coordinate (X2, Y2) at the lower right corner, the marker display controller 106 designates a rectangular region defined by the coordinate (X1, Y1) at the upper left corner and a coordinate (X2, Y2) at the lower right corner, as a marker display region. Predetermined colors are selected in advance as the marker color, and stored in the storage device 40. The marker display controller 106 turns the marker display region to one of the marker colors stored in the storage device 40.

When the color of the target character and the marker color are similar to each other, the marker display controller 106 changes the color of the target character to a dissimilar color to the marker color. The color of the target character can be identified according to the font color information included in the document data M1, and the marker color is stored in the storage device 40 in advance. Therefore, these colors can both be identified. The storage device 40 also contains a color coordination table, which can be utilized to identify the color of the target character. The color coordination table indicates that, for example, when the marker color is yellow, a black target character is to be maintained as it is, but a yellow target character is to be changed to black. In other words, when the target character is black and the marker color is yellow, the black target character is displayed on the yellow background, which makes the target character clearly visible, and therefore the marker display controller 106 maintains the black color of the target character. However, when the target character is yellow, the marker display controller 106 changes the color of the target character, for example from yellow to black, because the yellow character on the yellow background is difficult to visually recognize. Therefore, the target character on which the marker MK is displayed can be made clearly visible.

Figure 8A:
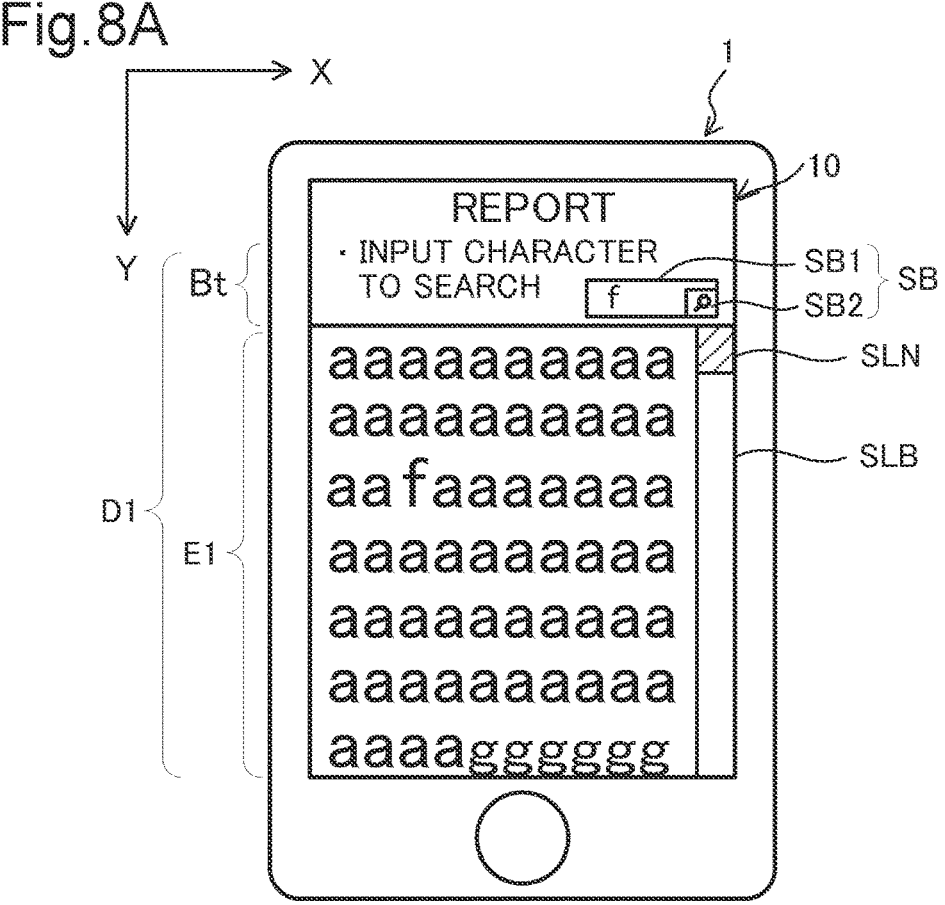
FIG. 8A is a schematic drawing showing an example of a screen in which a character to search has been inputted in a search box.
Figure 8B:
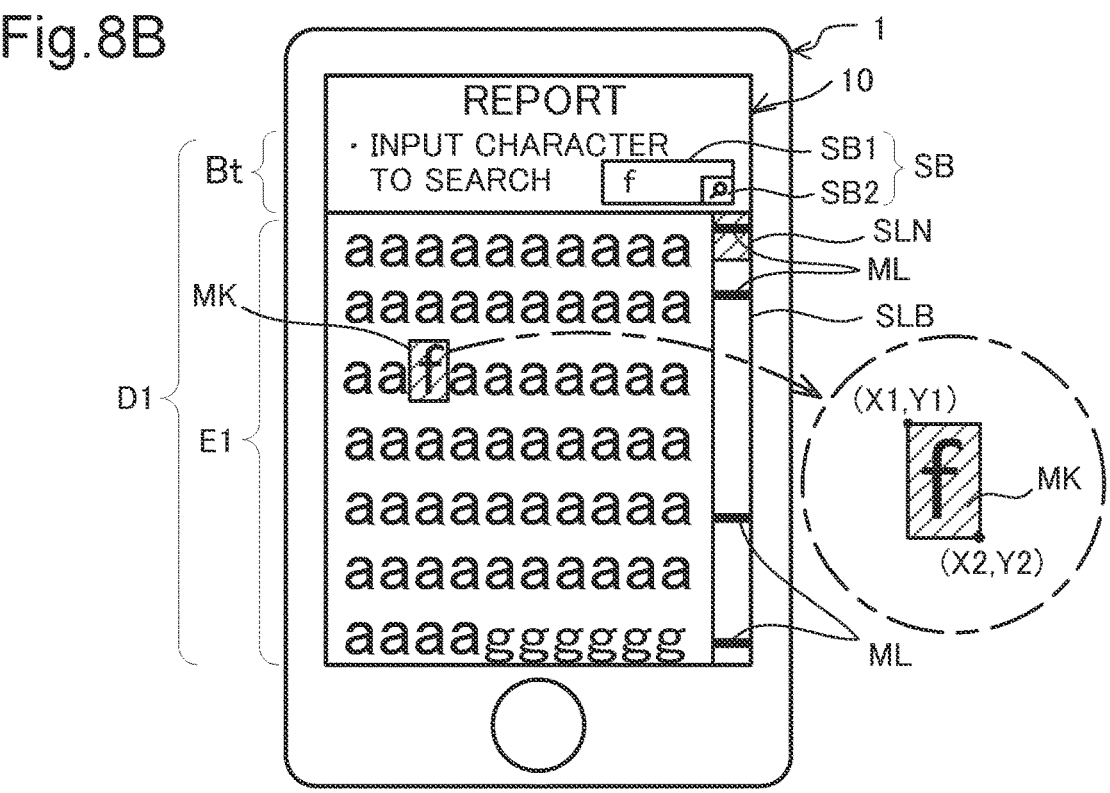
FIG. 8B is a schematic drawing showing an example of a screen in which a marker is displayed on the character to search.

The display controller 103 (i) causes the display device 10, when the operation receiver 102 receives an instruction based on the slide operation, performed on the marker MK displayed on the display device 10 and detected by the touch panel 20, to display a next marker MK located on an opposite side, in the direction of the slide operation. More specifically, the touch panel 20 detects the slide operation performed on the marker MK displayed on the display device 10, in other words the rectangular marker display region defined by the coordinate (X1, Y1) at the upper left corner and a coordinate (X2, Y2) at the lower right corner, as shown in FIG. 8B to be subsequently referred to. When the slide operation is performed on the marker MK, the display controller 103 causes the display device 10 to display the next marker MK on the opposite side, in the direction of the slide operation.

The display controller 103 (ii) causes the display device 10, when the operation receiver 102 receives an instruction based on the slide operation, performed on a position other than the marker MK displayed on the display device 10 and detected by the touch panel 20, to scroll the screen on the display device 10 in the direction of the slide operation.

The scroll bar display controller 107 causes the display device 10, when the size of the document data M1 is larger than the screen of the display device 10, to display a scroll bar SLB indicating, by the position thereof in the screen of the display device 10, which part of the entirety of the document data M1 the portion being displayed on the screen of the display device 10 corresponds to. To be more detailed, the scroll bar display controller 107 displays the scroll bar SLB along the right-hand end of the display region E1, with a knob SLN indicating the position of the portion of the document data M1 being displayed in the display region E1.

The identifier 108 identifies the position on the scroll bar SLB, corresponding to the position of the target character detected by the searcher 105. More specifically, the identifier 108 sets the length of the scroll bar SLB to the length of the display region E1 of the display device 10 in the Y-direction. Then the identifier 108 determines the length of the knob SLN, by dividing the length of the document data M1 shown in FIG. 3 in the Y-direction, by the length of the display region E1 of the display device 10 in the Y-direction. Further, the identifier 108 identifies the respective positions of the target characters, with respect to the entire length of the portion of the document data M1 shown in FIG. 3 where the characters are written, and applies the identified positions of the target characters to the scroll bar SLB, by proportionally reducing the entire length of the portion of the document data M1 to the length of the scroll bar SLB. As result, the positions respectively corresponding to the target characters are identified on the scroll bar SLB.

The display controller 103 displays marks ML, each indicating that the target character is located at the position on the scroll bar SLB identified by the identifier 108. The display controller 103 displays the marks ML at the corresponding positions on the scroll bar SLB, in a display format stored in advance in the storage device 40 (e.g., horizontal bars in FIG. 8B to be subsequently referred to).

When the operation receiver 102 receives an instruction to move to the position corresponding to the mark ML displayed on the scroll bar SLB, as result of a touch operation performed on the mark ML and detected by the touch panel 20, the display controller 103 causes the display device 10 to display the marker MK, at the position corresponding to the mark ML. Here, when a touch operation is performed on the scroll bar SLB, but not on the mark ML, the display controller 103 scrolls the screen of the display device 10, as in the case of an ordinary slide operation.

The display controller 103 (iii) causes the display device 10, when the operation receiver 102 receives an instruction based on the double slide operation, performed by touching the marker MK and a position other than the marker MK on the display device 10 and then sliding therefrom, and simultaneously detected by the touch panel 20, to display an extreme-end marker MK (farthest marker MK) located at the extreme end of one or a plurality of markers MK, located on the opposite side in the direction of the slide operation.

Figure 5:
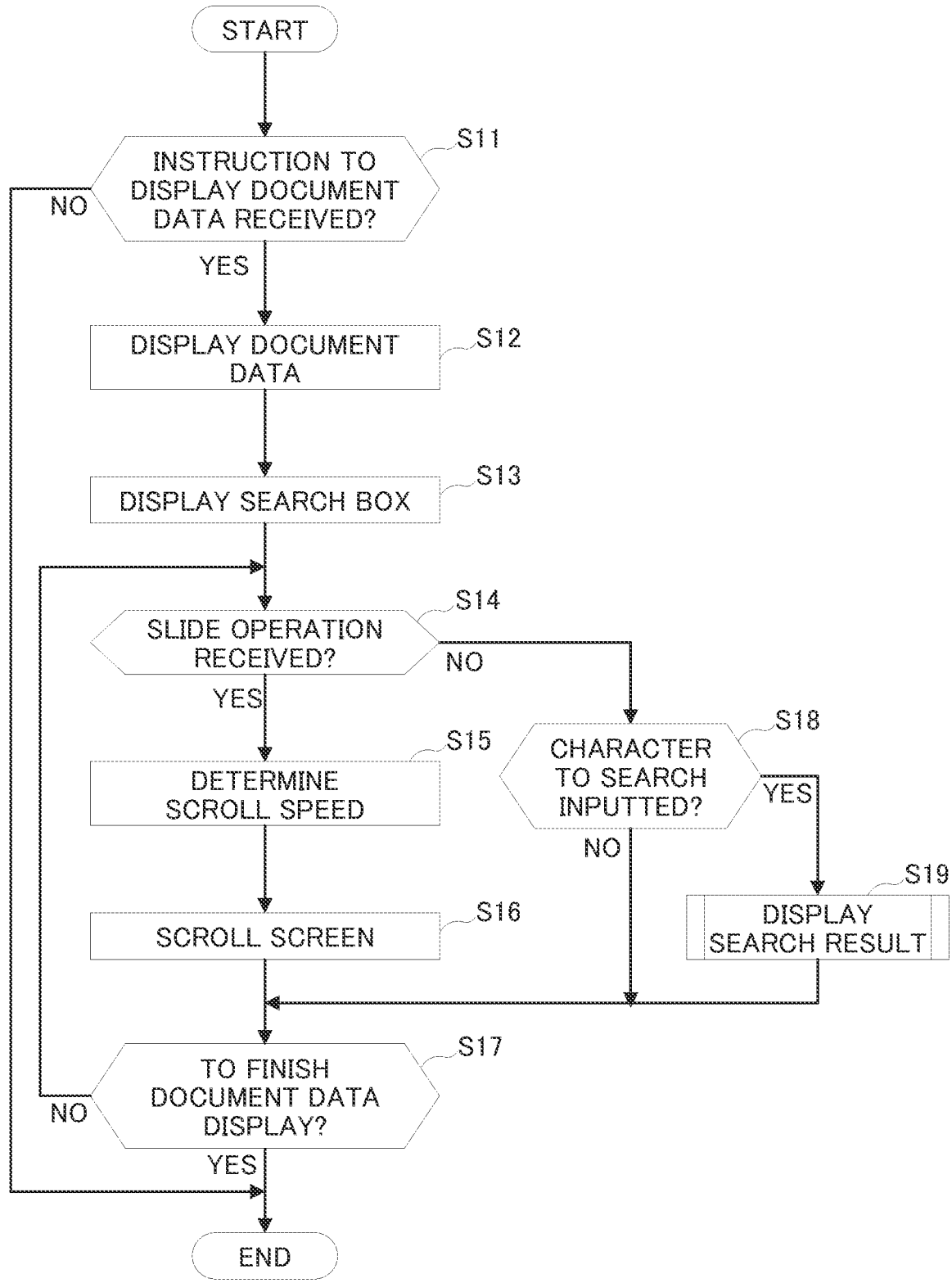
FIG. 5 is a flowchart showing a displaying operation performed by the display apparatus according to the first embodiment.
Figure 6:
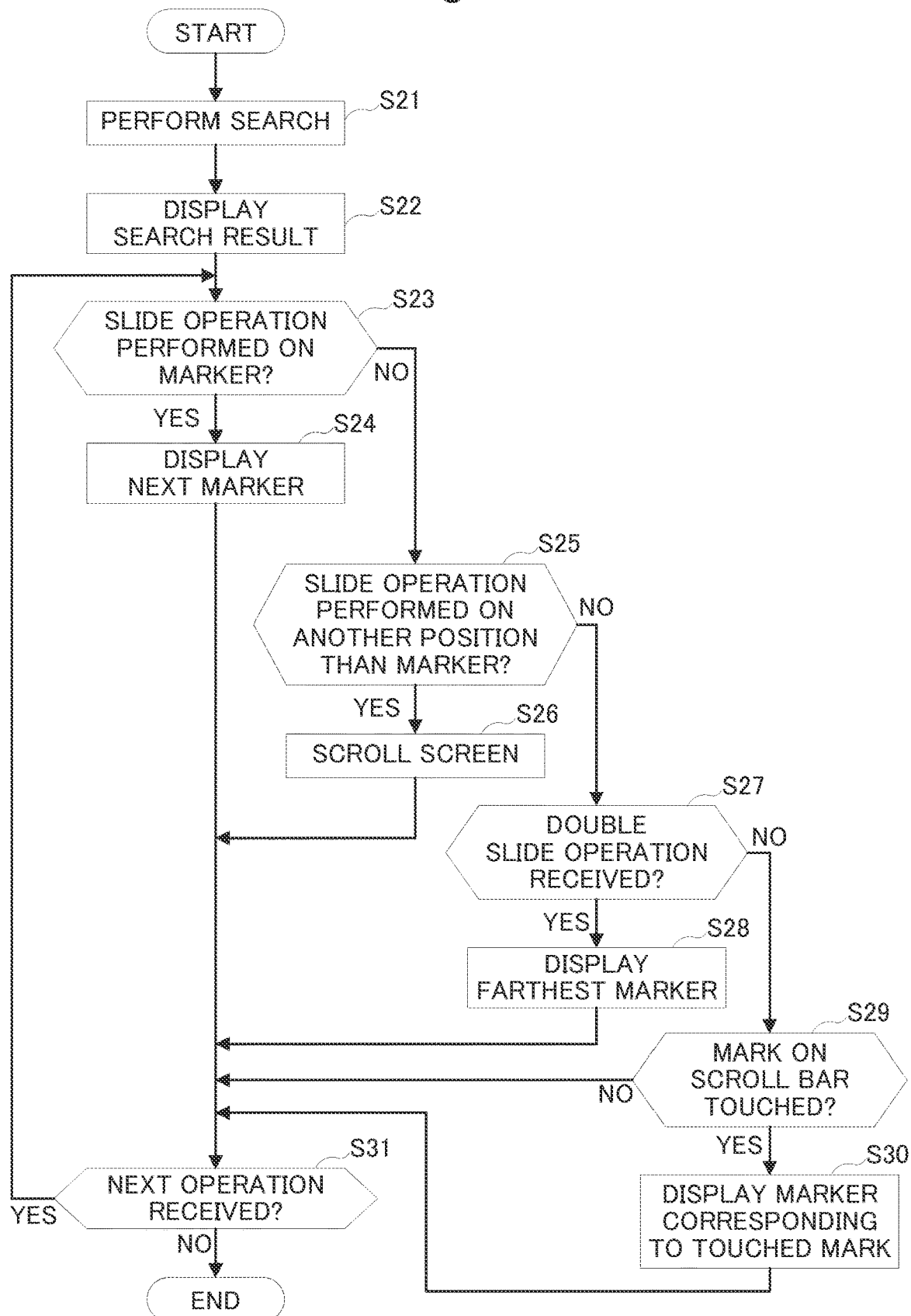
FIG. 6 is a flowchart showing a search result display operation performed by the display apparatus according to the first embodiment.

Hereunder, a displaying operation performed by the display apparatus 1 will be described. FIG. 5 is a flowchart showing the displaying operation performed by the display apparatus according to the first embodiment. FIG. 6 is a flowchart showing a search result display operation performed by the display apparatus according to the first embodiment. It will be assumed here that a button image K1 showing "Display Document" is displayed on the display device 10 of the display apparatus 1 shown in FIG. 1.

When the user touches the button image K1 on the display device 10 with the finger and then releases the finger from the contact position, the touch panel 20 outputs a detection signal indicating the position where the touch has been detected, to the operation receiver 102. Upon receipt of the detection signal, the operation receiver 102 identifies that the operation inputted by the user is a tap operation, and receives the instruction to display the document data, from the user (YES at S11).

When the operation receiver 102 receives the instruction to display the document data from the user (YES at S11), the display controller 103 retrieves the document data M1 from the document data memory 104, and causes the display device 10 to display the portion PI of the document data M1

(see FIG. 3), as shown in FIG. 4 (S12). In other words, the display controller 103 causes the display device 10 to display the first page of the document data M1, as shown in FIG. 3 and FIG. 4.

The display controller 103 displays the search box SB for inputting the character to search related to the document data M1, in the screen D1 (S13).

When the operation receiver 102 receives the scrolling instruction based on the slide operation (e.g., swipe operation) performed on the document data M1 (YES at S14), the display controller 103 determines the scroll direction and the scroll speed, according to whether a contact has been made, and the contact position, detected by the touch panel 20 (S15). In this example, it will be assumed that the swipe operation has been performed on the document data M1, when the document data M1, which is the scrollable image, is displayed on the display device 10 (see FIG. 7A).

Figure 7A:
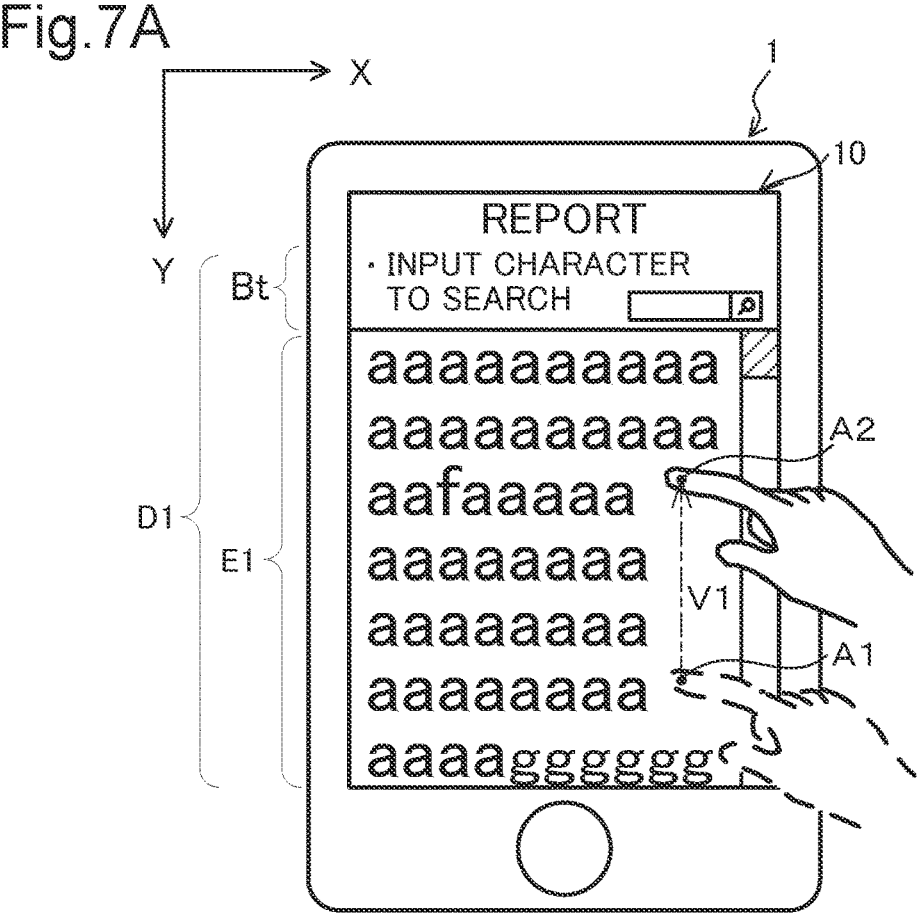
FIG. 7A is a schematic drawing showing an example of a swipe operation performed on the screen.
Figure 7B:
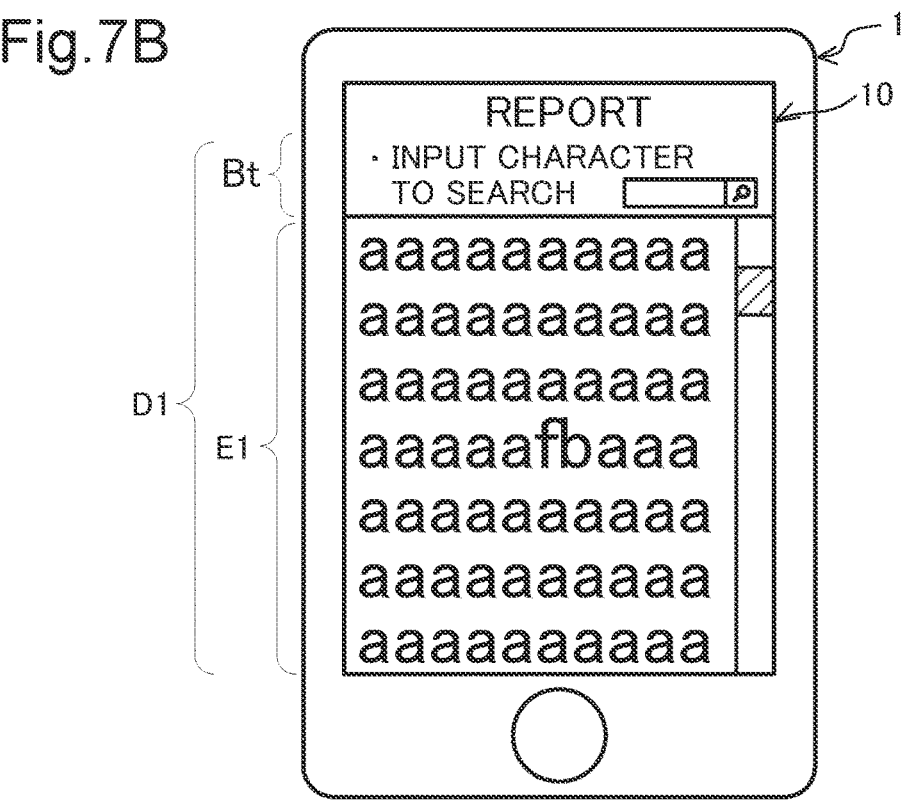
FIG. 7B is a schematic drawing showing an example of a screen that appears as result of the swipe operation.

FIG. 7A illustrates an example of the swipe operation performed on the screen. FIG. 7B illustrates an example of the screen that appears as result of the swipe operation. When an index finger is made to slide from a position A1 and to stop sliding at another position A2 as shown in FIG. 7A, the operation receiver 102 identifies that the slide operation has been received, according to the detection signal outputted from the touch panel 20. The display controller 103 sets the speed of the scroll display of the document data M1, to a speed V2 (=proportionality constant×V1) by multiplying the change rate V1 of the pressed position by a predetermined proportionality constant. In addition, when the change direction of the pressed position contains a Y-direction component shown in FIG. 3, the display controller 103 sets the scroll direction to the Y-direction.

The display controller 103 scrolls the screen D1, in the scroll direction and at the scroll speed V2 determined at S15, as shown in FIG. 7B (S16).

In contrast, in the case where the display controller 103 has not received a scroll instruction (NO at S14), and that the operation receiver 102 has received an input of a character to search (YES at S18), the display controller 103 performs the search result display operation (S19). To be more detailed, when the touch panel 20 detects that "f" has been inputted in the search box SB as the character to search, and that the search execution button SB2 has been tapped as shown in FIG. 8A, and the operation receiver 102 receives such detection result from the touch panel 20 (YES at S18), the display controller 103 performs the search result display operation (S19).

Referring to FIG. 6, the search result display operation performed at S19 by the display apparatus 1 will be described in detail. Further, the screen related to the search result display operation performed by the display apparatus 1 will be described, with reference to FIG. 8A and FIG. 8B. FIG. 8A illustrates an example of the screen in which the character to search has been inputted in the search box. FIG. 8B illustrates an example of the screen in which the marker is displayed on the character to search.

The searcher 105 searches the document data M1 for a target character "f", which accords with the character to search "f" (S21). To be more detailed, the searcher 105 sequentially detects the target characters that accord with the character to search in the document data M1 received by the operation receiver 102 (e.g., "f" in FIG. 8A), and also the position information of each of the detected target characters, using the position information of the characters in the document data M1, stored in the storage device 40. The searcher 105 detects all the "f" s contained in the document data M1 shown in FIG. 3, and the position information of each "f" detected.

Further, the identifier 108 identifies positions on the scroll bar SLB, respectively corresponding to the positions of the target characters detected by the searcher 105.

The display controller 103 causes the display device 10 to display the detection result (S22).

To be more detailed, the display controller 103 causes the display device 10 to display the first page that includes the target character detected by the searcher 105 (page 1 in FIG. 8B), as shown in FIG. 8B. The marker display controller 106 applies the marker MK of a predetermined color, as shown in FIG. 8B, to the position indicated by the position information of the target character detected by the searcher 105 (e.g., rectangular region surrounding the target character). Further, the display controller 103 displays the marks ML each indicating the presence of the target character, at the positions on the scroll bar SLB identified by the identifier 108.

The display controller 103 decides whether a slide operation has been performed on the region of the marker MK (S23).

More specifically, the display controller 103 (i) causes the display device 10, when the operation receiver 102 receives the instruction based on the slide operation, performed on the marker MK displayed on the display device 10 and detected by the touch panel 20 (YES at S23), to display the next marker MK located on the opposite side, in the direction of the slide operation (S24).

Figure 9A:
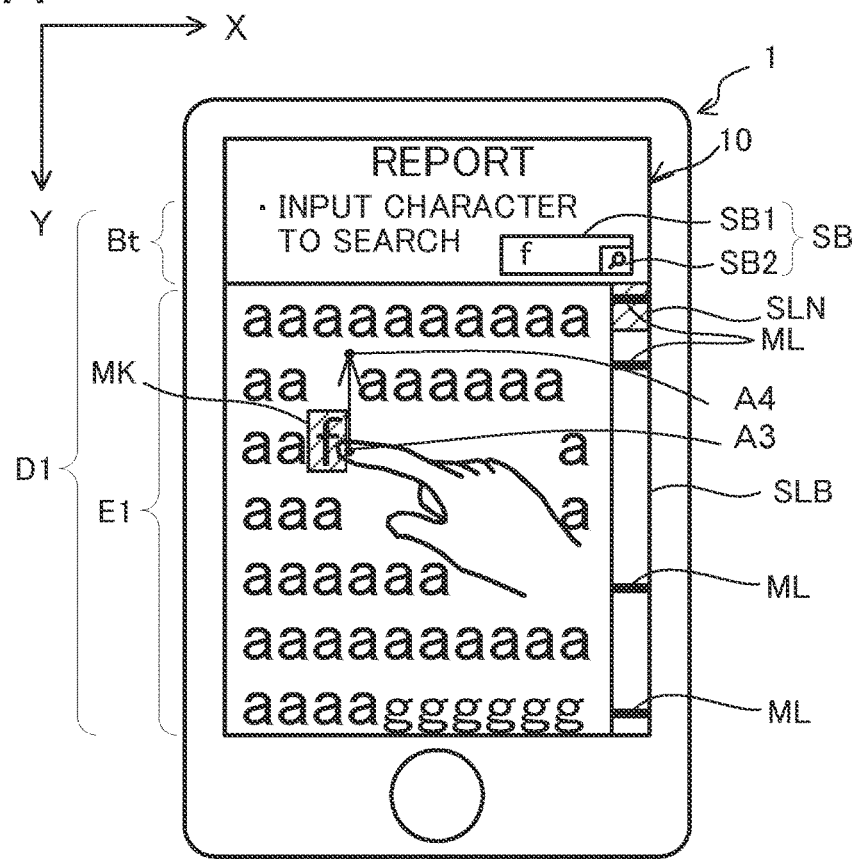
FIG. 9A is a schematic drawing showing an example of an upward slide operation performed on the region of the marker.
Figure 9B:
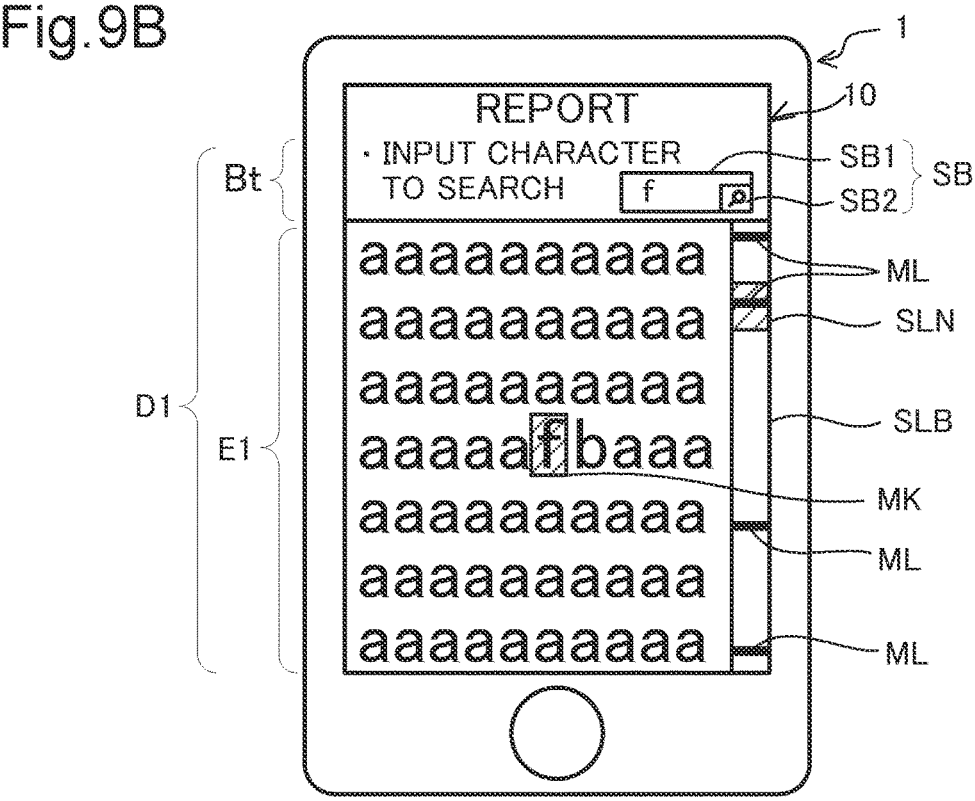
FIG. 9B is a schematic drawing showing an example of a screen that appears as result of the upward slide operation on the region of the marker.

FIG. 9A illustrates an example of an upward slide operation performed on the region of the marker. FIG. 9B illustrates an example of the screen that appears as result of the upward slide operation on the region of the marker. For example, when an upward slide operation is performed on the region of the marker MK displayed on the display device 10 as shown in FIG. 9A, in other words when the index finger is made to slide from a position A3 in the marker MK, and to stop sliding at another position A4, the display controller 103 causes the display device 10 to display, as shown in FIG. 9B, the next marker MK located on the opposite side in the direction of the upward slide operation (in FIG. 9B, marker MK on the fourth line from the top in the second page of the document data M1).

Figure 10A:
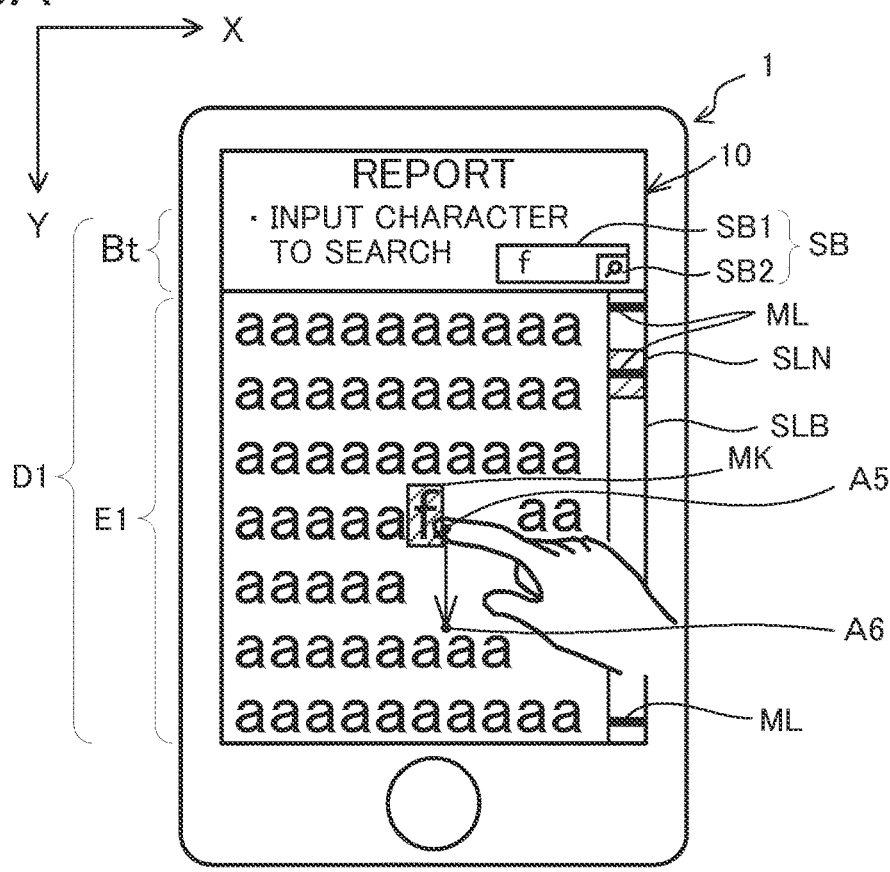
FIG. 10A is a schematic drawing showing an example of a downward slide operation performed on the region of the marker.
Figure 10B:
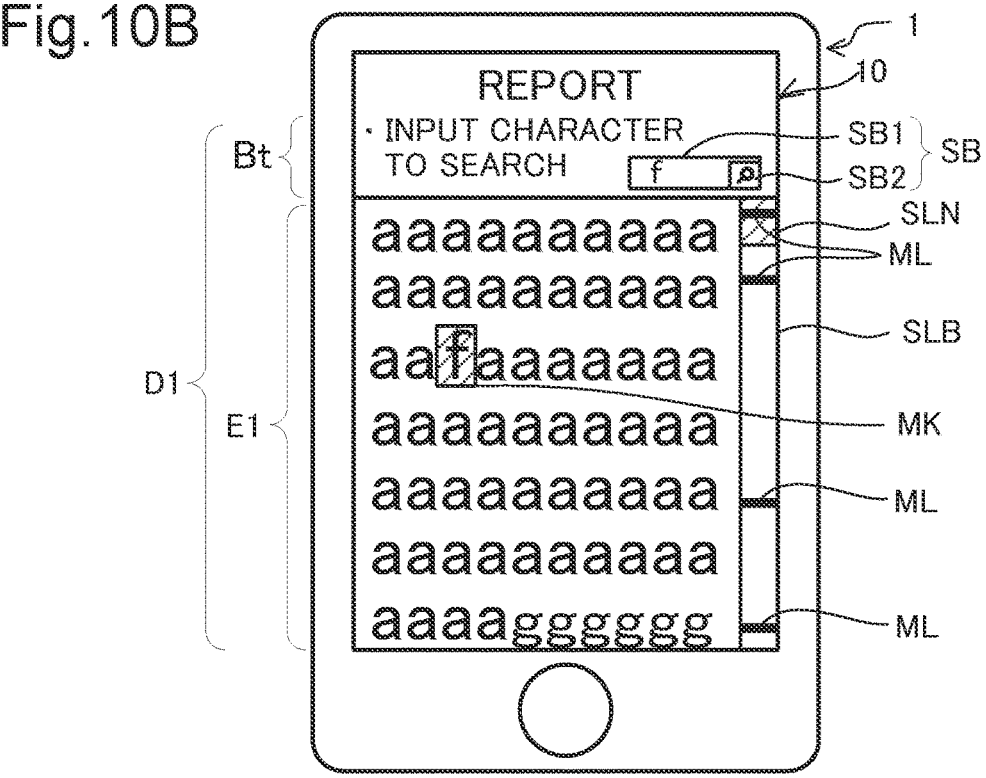
FIG. 10B is a schematic drawing showing an example of a screen that appears as result of the downward slide operation on the region of the marker.

FIG. 10A illustrates an example of a downward slide operation performed on the region of the marker. FIG. 10B illustrates an example of the screen that appears as result of the downward slide operation on the region of the marker. When a downward slide operation is performed on the region of the marker MK displayed on the display device 10, with the second page of the document data M1 being displayed thereon as shown in FIG. 10A in other words when the index finger is made to slide from a position A5 in the marker MK, and to stop sliding at another position A6, the display controller 103 causes the display device 10 to display, as shown in FIG. 10B, the next marker MK located on the opposite side in the direction of the downward slide operation (in FIG. 10B, marker MK on the third line from the top in the first page of the document data M1).

In contrast, upon deciding that the slide operation has not been performed on the region of the marker MK (NO at S23), the display controller 103 decides whether the slide operation has been performed on a position other than the marker MK displayed on the display device 10 (S25).

More specifically, the display controller 103 (ii) causes the display device 10, when the operation receiver 102 receives an instruction based on the slide operation, performed on a position other than the marker MK displayed on the display device 10 and detected by the touch panel 20 (YES at S25), to scroll the screen on the display device 10 in the direction of the slide operation (S26).

Figure 11A:
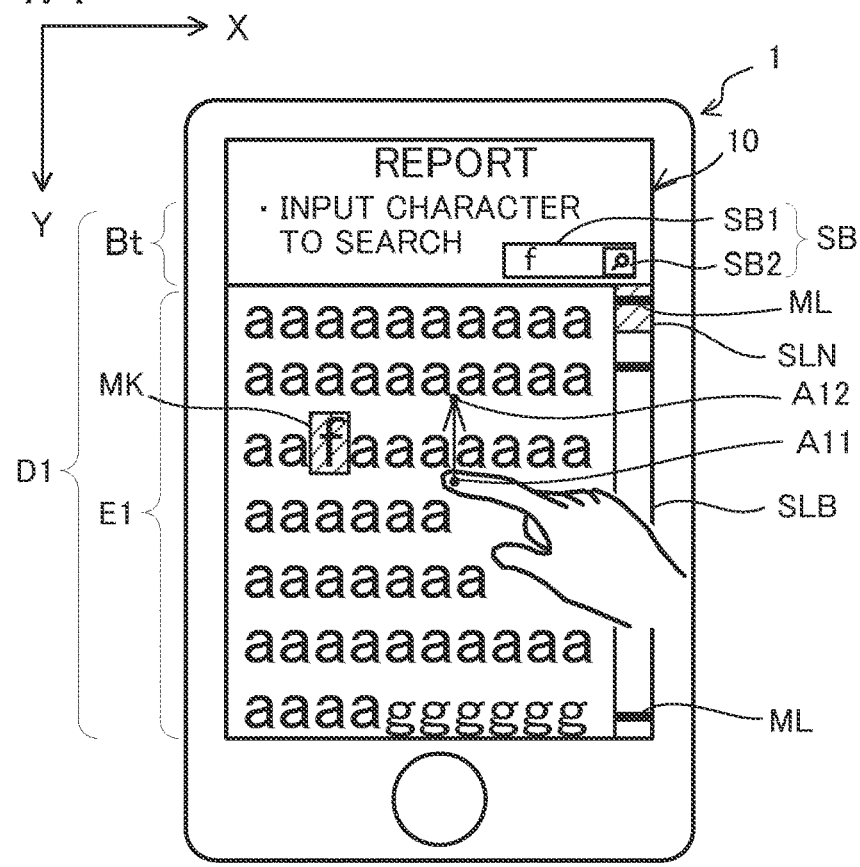
FIG. 11A is a schematic drawing showing an example of a slide operation performed on a position other than the position of the marker.
Figure 11B:
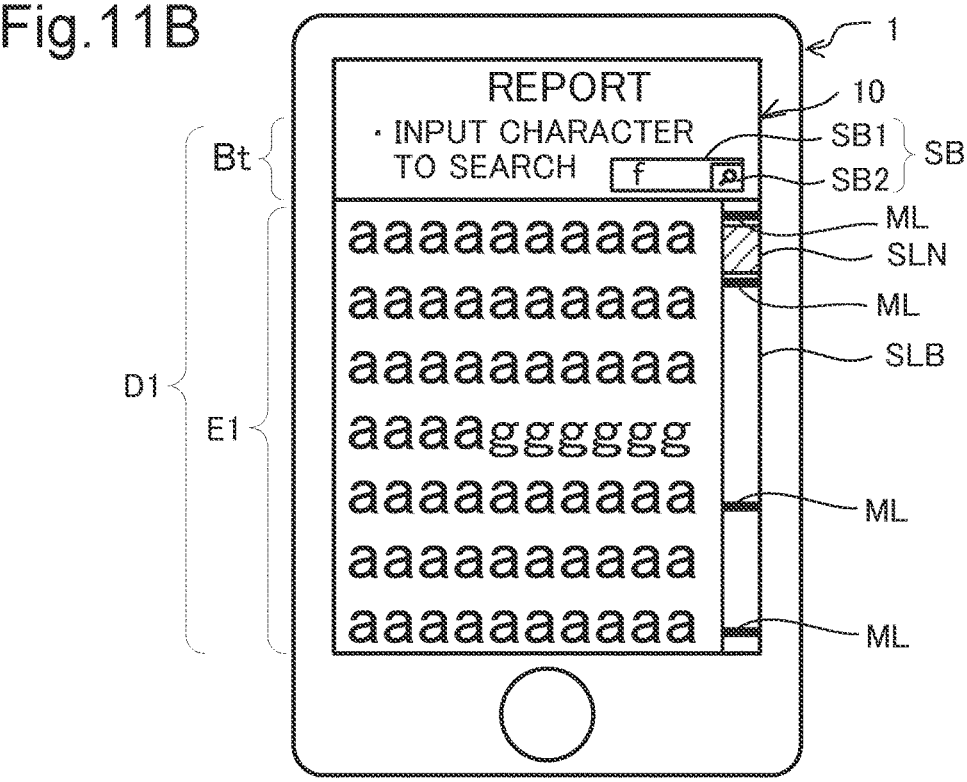
FIG. 11B is a schematic drawing showing an example of a screen that appears as result of the slide operation performed on the position other than the position of the marker.

FIG. 11A illustrates an example of a slide operation performed on a position other than the position of the marker. FIG. 11B illustrates an example of the screen that appears as result of the slide operation performed on the position other than the position of the marker. When the slide operation is performed on a position other than the position of the marker MK displayed on the display device 10 as shown in FIG. 11A in other words when the index finger is made to slide from a position A11 other than the position of the marker MK, and to stop sliding at another position A12, the display controller 103 causes the display device 10 to scroll the screen in the direction of the slide operation, as shown in FIG. 11B.

In contrast, upon deciding that the slide operation has not been performed on the position other than the position of the marker MK (NO at S25), the display controller 103 decides whether a double slide operation has been performed (S27).

The display controller 103 (iii) causes the display device 10, when the operation receiver 102 receives an instruction based on the double slide operation, performed by touching the marker MK and a position other than the marker MK on the display device 10 and then sliding therefrom, and simultaneously detected by the touch panel 20 (YES at S27), to display an extreme-end marker MK (farthest marker MK) located at the extreme end of one or a plurality of markers MK, located on the opposite side in the direction of the slide operation (S28).

Figure 12A:
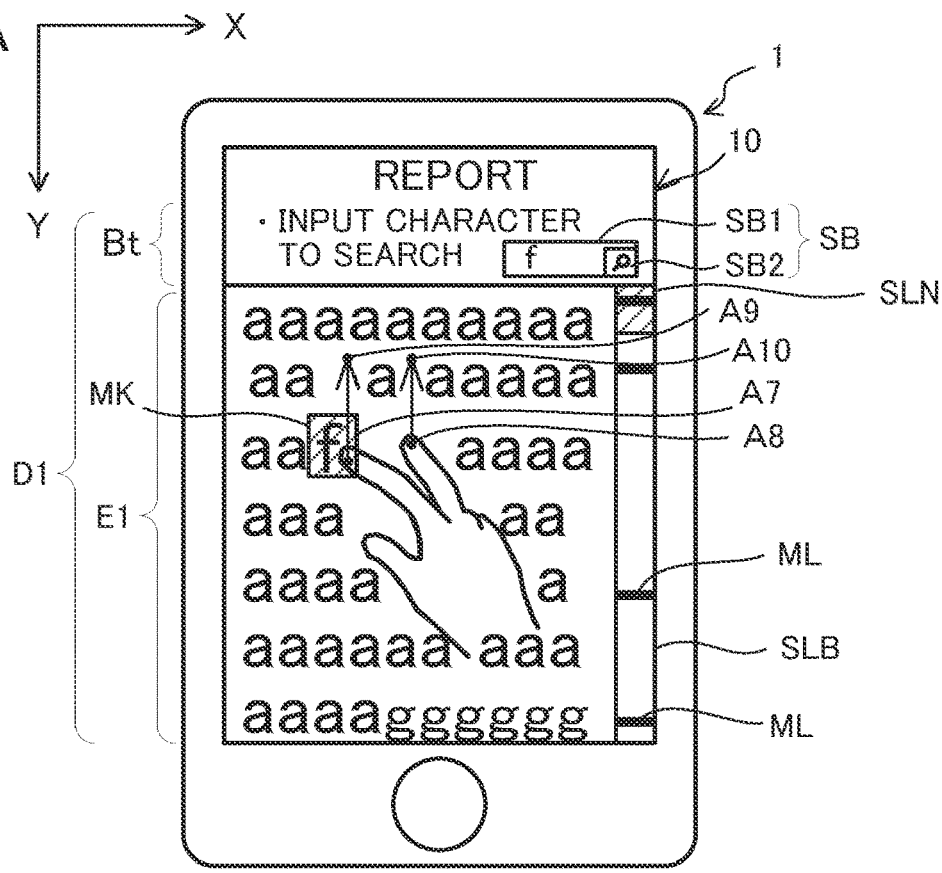
FIG. 12A is a schematic drawing showing an example of a double slide operation.
Figure 12B:
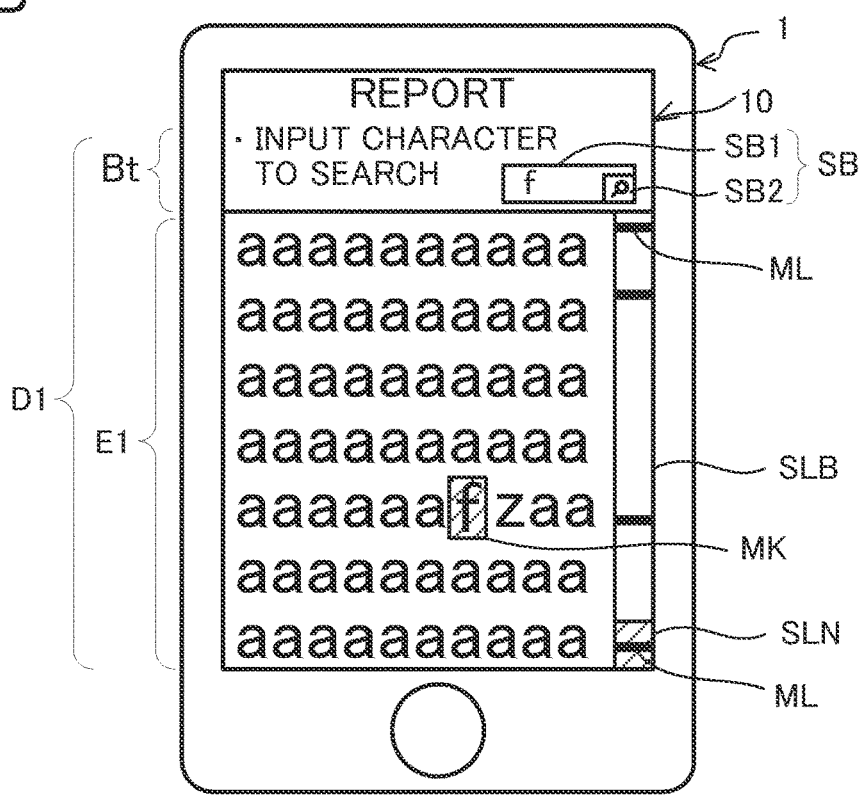
FIG. 12B is a schematic drawing showing an example of a screen that appears as result of the double slide operation.

FIG. 12A illustrates an example of the double slide operation. FIG. 12B illustrates an example of the screen that appears as result of the double slide operation. When an upward double slide operation is performed, by touching the region of the marker MK displayed on the display device 10, and another position than the marker MK, and sliding therefrom as shown in FIG. 12A, in other words when the index finger is made to slide upward from a position A7 in the marker MK, and the middle finger is made to slide upward, at the same time, from another position A8 than the position of the marker MK, and then the slide operations are stopped at other positions A9 and A10, the display controller 103 causes the display device 10 to display, as shown in FIG. 12B, the lowermost marker MK of one or a plurality of markers MK, located on the opposite side in the direction of the slide operation (in FIG. 12B, marker MK on the third line from the bottom in the n-th page of the document data M1).

Likewise, when a downward double slide operation is performed on the screen shown in FIG. 12B, in other words when the index finger is made to slide downward from the region of the marker MK shown in FIG. 12B, and the middle finger is made to slide downward, at the same time, from another position than the position of the marker MK, and then the slide operations are stopped at other positions, the display controller 103 causes the display device 10 to display the uppermost marker MK of one or a plurality of markers MK, located on the opposite side in the direction of the slide operation, in other words the marker MK on the third line from the bottom in the first page of the document data M1 as shown in FIG. 12A.

In contrast, upon deciding that the double slide operation has not been performed (NO at S27), the display controller 103 decides whether a touch operation has been performed on the position of the mark ML on the scroll bar SLB (S29).

When the operation receiver 102 receives the instruction to move to the position corresponding to the mark ML, according to the detection by the touch panel that the mark ML displayed on the scroll bar SLB has been touched (YES at S29), the display controller 103 causes the display device 10 to display the marker MK located at the position corresponding to the position of the mark ML that has been touched (S30).

Figure 13A:
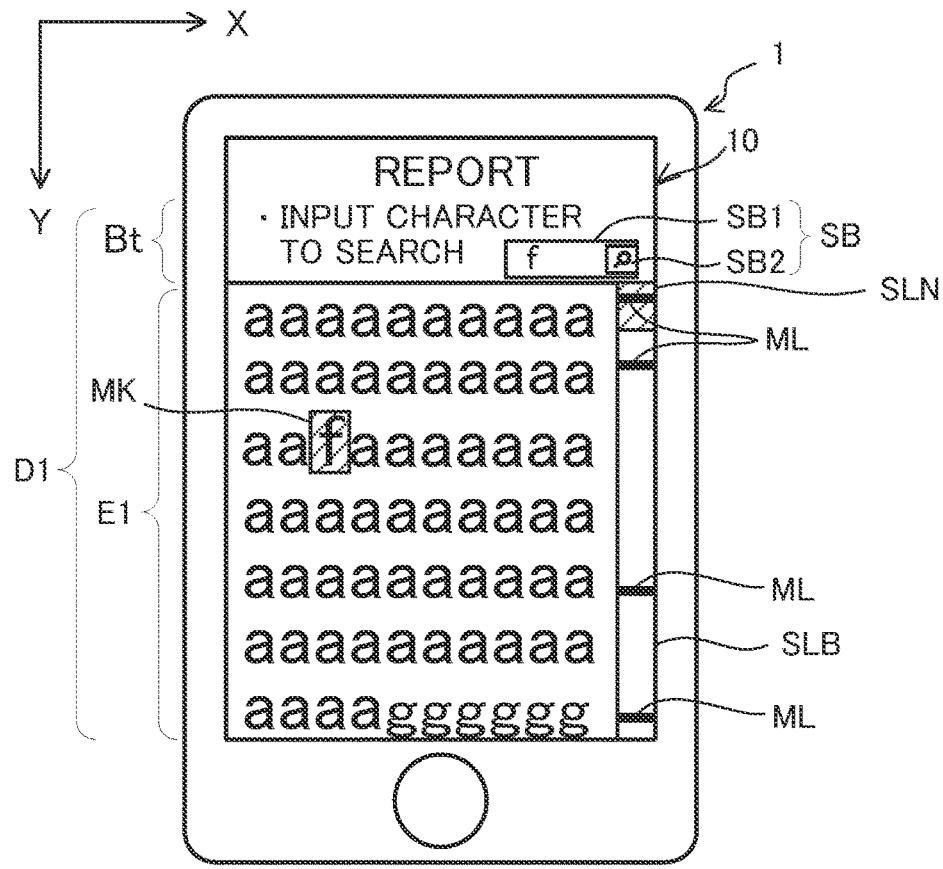
FIG. 13A is a schematic drawing showing an example of a touch operation performed on a marked position on a scroll bar.
Figure 13B:
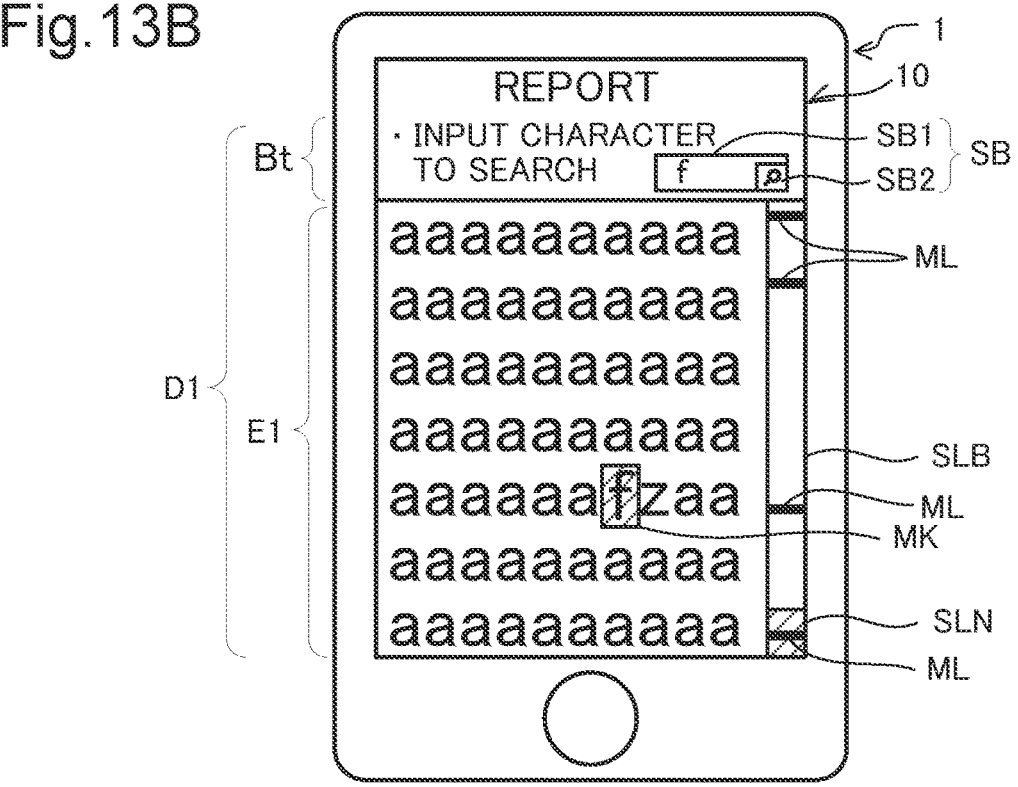
FIG. 13B is a schematic drawing showing an example of a screen that appears as result of the touch operation performed on the marked position on the scroll bar.

FIG. 13A illustrates an example of the touch operation performed on the marked position on the scroll bar. FIG. 13B illustrates an example of the screen that appears as result of the touch operation performed on the marked position on the scroll bar. When the touch operation is performed, for example, on the lowermost mark ML, located at the lowermost position in the Y-direction on the scroll bar SLB shown in FIG. 13A, the display controller 103 causes the display device 10 to display, as shown in FIG. 13B, the extreme end marker MK located at the position corresponding to the position of the lowermost mark ML (in FIG. 13B, marker MK on the third line from the bottom in the n-th page of the document data M1).

After S24, after S26, after S28, after S30, or upon deciding that the mark ML on the scroll bar SLB has not been touched (NO at S29), the display controller 103 decides whether a next operation has been performed (S31). When a next operation has been performed (YES at S31), the display controller 103 returns to S23, but finishes the search result display operation when no additional operation is performed (NO at S31) and proceeds to S17 shown in FIG. 5.

Referring again to FIG. 5, in the case where the operation receiver 102 has not received the input of the character to search (NO at S18), or after completing the operation of S19, the controller 101 decides whether an instruction to finish the display of the document data has been received from the user (S17), and returns to S14 when the instruction to finish the display of the document data has not been received (NO at S17). When the instruction to finish the display of the document data has been received (YES at S17), or in the case where the instruction to display the document data has not been received at S11 (NO at S11), the controller 101 finishes the display operation.

According to the first embodiment, as described above, when the operation receiver 102 receives the input of the character to search, the searcher 105 searches the document data M1 displayed on the display device 10 for the target character that accords with the character to search. The marker display controller 106 applies the marker MK to the position of the target character detected by the searcher 105. The display controller 103 (i) causes the display device 10 to display the next marker MK located on the opposite side, in the direction of the slide operation, when the slide operation is performed on the marker MK displayed on the display device 10. Therefore, when the user performs the slide operation performed on the region of the marker MK, the display can be jumped to the position of the next marker MK (i.e., the position of the next target character). Such an arrangement eliminates the need to move the visual line between the search button (next button or previous button) prepared in advance on the screen of the existing display apparatus, and the position of the marker MK (position of the target character). In other words, the user can perform the searching operation keeping the eyes on the position of the matching character, and therefore the burden on the user in performing the character search in the document data M1 can be alleviated. In addition, since there is no need to provide the search button on the screen of the display device 10, the screen of the display device 10 can effectively utilized.

In addition, the display controller 103 (*ii*) causes the display device 10 to scroll the screen on the display device 10 in the direction of the slide operation, when the slide operation is performed on a position other than the marker MK displayed on the display device 10. Accordingly, the screen of the display device 10 can be scrolled, by the slide operation performed by the user on a position other than the position of the marker MK.

Consequently, the screen operation for the search display and for the scroll display can be facilitated, which leads to improved convenience in operating the screen.

When the document data M1 is larger than the screen of the display device 10, the scroll bar display controller 107 causes the display device 10 to display the scroll bar SLB, which indicates, by the display position thereof, which part of the entirety of the document data M1 the portion being displayed on the screen of the display device 10 corresponds to. The identifier 108 identifies the position on the scroll bar SLB corresponding to the position of the target character detected by the searcher 105. The display controller 103 displays the marks ML each indicating the presence of the target character at the position corresponding to the position on the scroll bar SLB identified by the identifier 108. Thus, the marks ML indicating the presence of the target character can be displayed on the scroll bar SLB, by which the user can be aware at which positions of the document data M1 other target characters not shown on the screen of the display device 10 are located. This serves as an effective support in the search of the target character.

Further, when the operation receiver 102 receives the instruction to move to the position corresponding to the mark ML, according to the detection by the touch panel that the position of the mark ML on the scroll bar SLB has been touched, the display controller 103 causes the display device 10 to display the marker MK located at the position corresponding to the mark ML that has been touched. Therefore, simply by touching the mark ML displayed on the scroll bar SLB, the marker MK corresponding to the position of the mark ML can be displayed on the display device 10, which serves as an effective support in the search of the target character.

Further, the display controller 103 (iii) causes the display device 10, when the operation receiver 102 receives an instruction based on the double slide operation, performed by touching the marker MK and a position other than the marker MK on the display device 10 and then sliding therefrom, and simultaneously detected by the touch panel 20, to display an extreme-end marker MK located at the extreme end of one or a plurality of markers MK, located on the opposite side in the direction of the slide operation. Therefore, with the double slide operation performed on the marker MK and another position, the display can be jumped at a time to the position of the extreme end marker MK, located at the extreme end of one or a plurality of markers MK located on the opposite side, in the direction of the slide operation. Such an arrangement saves the trouble of jumping to the next marker MK one by one, thereby improving the convenience in the searching operation.

Hereunder, a display apparatus according to a second embodiment will be described.

Whereas the marker MK is applied to the position of the target character detected by the searcher 105 in the first embodiment, the display apparatus according to the second embodiment additionally includes an operation assisting region display controller 109, which displays an operation assisting region larger than the marker MK, when region of the target character, in other words the size of the marker MK is small.

Figure 14:
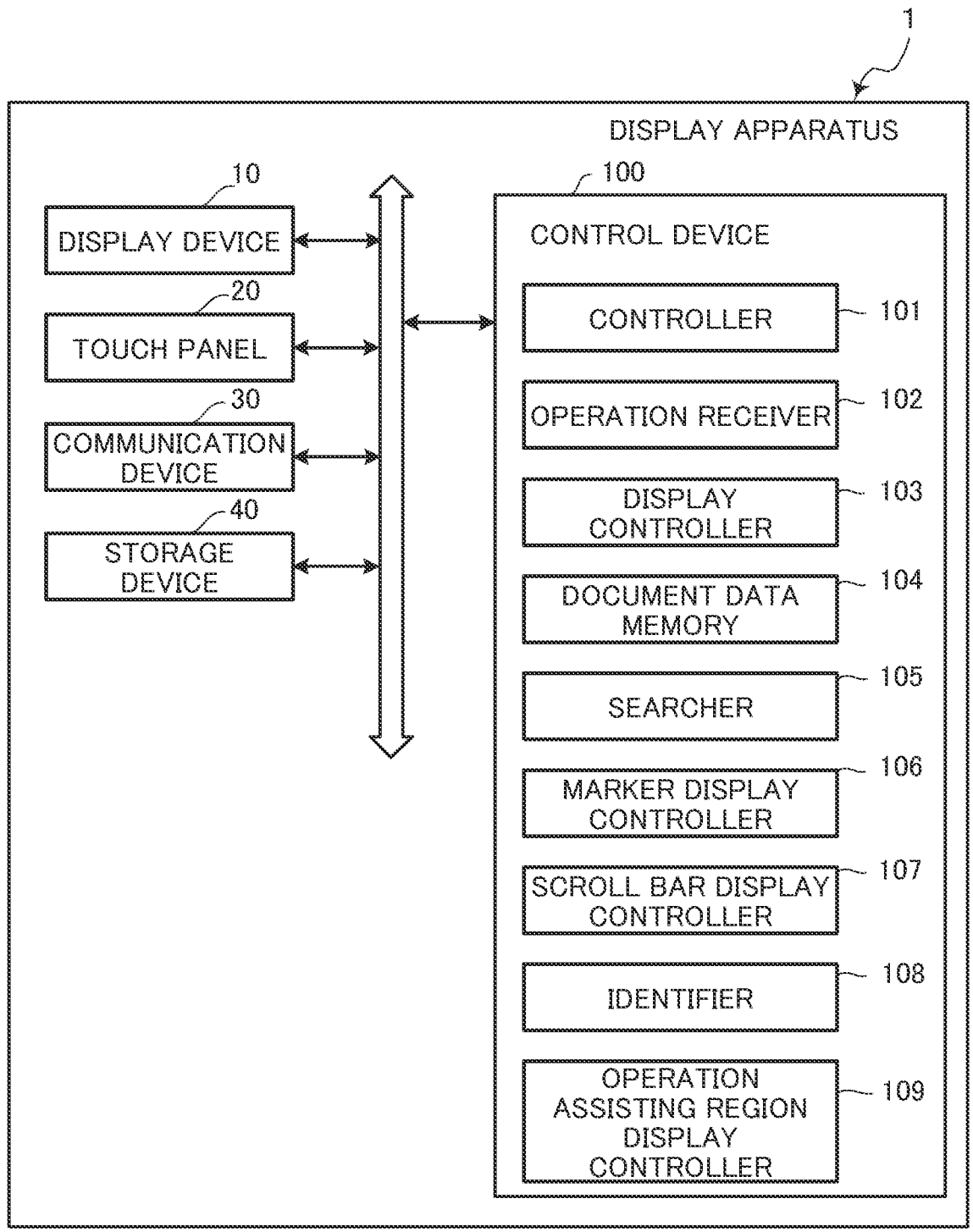
FIG. 14 is a block diagram showing an essential internal configuration of a display apparatus according to a second embodiment.
Figure 15:
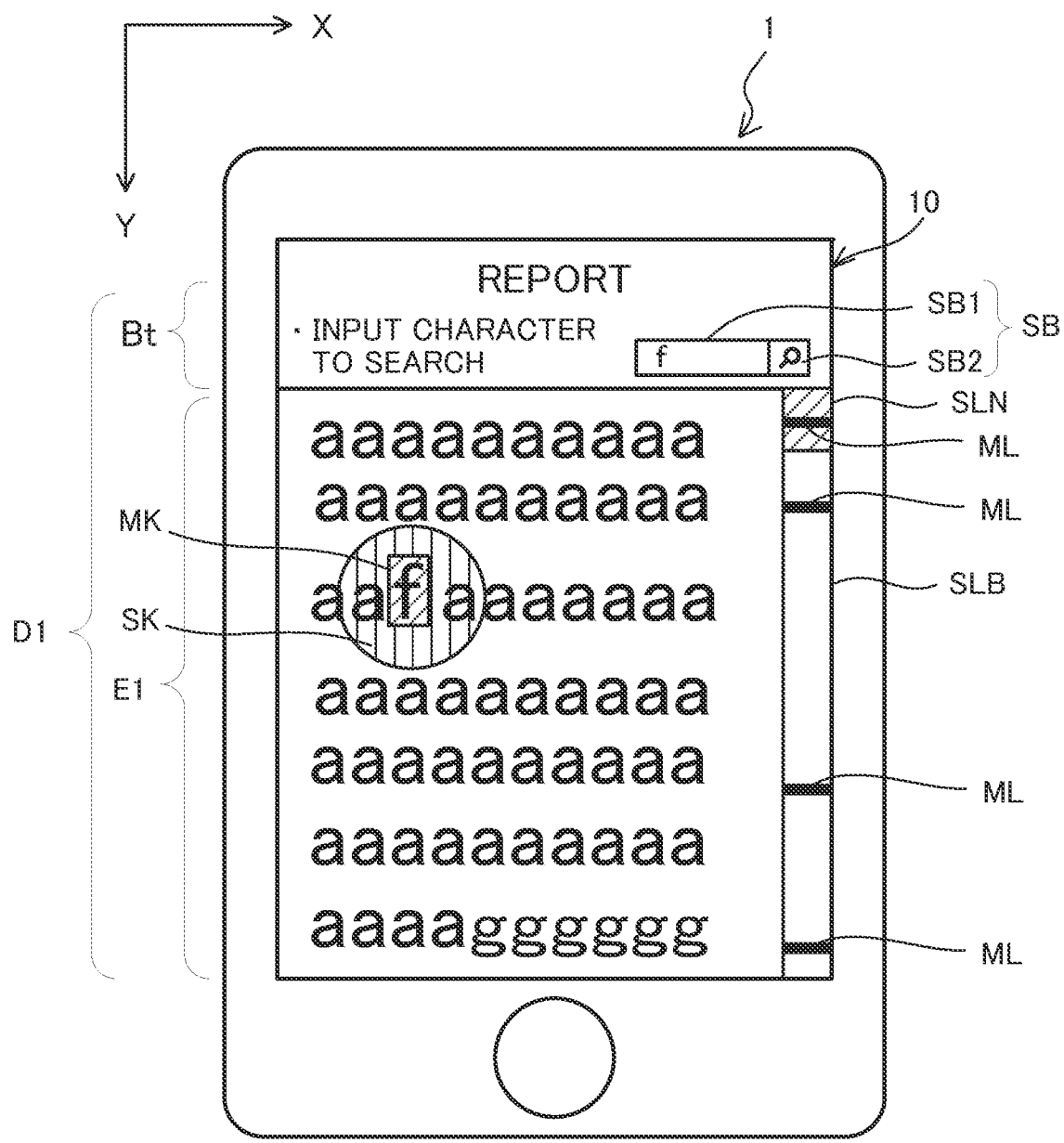
FIG. 15 is a schematic drawing showing an example of a screen displaying an operation assisting region, in the display apparatus according to the second embodiment.

FIG. 14 is a block diagram showing an essential internal configuration of the display apparatus according to the second embodiment. FIG. 15 is a schematic drawing showing an example of a screen displaying the operation assisting region, in the display apparatus according to the second embodiment.

When the target character detected by the searcher 105 consists of a single character (e.g., "f"), the operation assisting region display controller 109 displays, as shown in FIG. 15, an operation assisting region SK of a predetermined size larger than the region of the target character, and surrounding the region of the target character. The operation assisting region SK covers a circular region around the target character "f" at the center, having a diameter corresponding to a length of a plurality of characters (e.g., 3 characters). Here, the shape of the operation assisting region SK is not limited to the circular shape but may be, for example, a rectangular shape.

Alternatively, the operation assisting region display controller 109 may display the circular operation assisting region SK having a diameter of 15 mm, or a square operation assisting region SK each side of which has a length of 15 mm, when the region of the target character detected by the searcher 105 is smaller than a predetermined threshold (e.g., the length of a side of the region of the target character is 5 mm, or the area of the square region is 25 mm$^2$).

The display controller 103 (*i*) causes the display device 10, when the operation receiver 102 receives an instruction based on the slide operation, performed on the operation assisting region SK displayed on the display device 10 and detected by the touch panel 20, to display the next marker MK located on the opposite side, in the direction of the slide operation, and (ii) causes the display device 10, when the operation receiver 102 receives an instruction based on the slide operation, performed on a position other than the operation assisting region SK displayed on the display device 10 and detected by the touch panel 20, to scroll the screen on the display device 10 in the direction of the slide operation.

According to the second embodiment, when the target character detected by the searcher 105 consists of a single character, or when the region of the target character is small, the operation assisting region SK larger than the region of the target character is displayed, and when the user performs a slide operation on the operation assisting region SK, the next marker MK can be displayed on the display device 10. Thus, the slide operation on the region of the target character can be assisted, when the region of the target character is small, which leads to improved user-friendliness in performing the slide operation.

The present invention is not limited to the foregoing embodiments, but may be modified in various manners. For example, although the scroll of the screen refers to the vertical scroll in the foregoing embodiments, the technical idea of the present invention described in the form of the foregoing embodiments may be applied to the case of horizontal scroll.

Although the character to search to be inputted is exemplified by a single character (e.g., "f") in the foregoing embodiments, the character to search may consist of two or more characters.

According to the foregoing embodiments, the marker MK located on the opposite side in the direction of the slide operation is displayed on the display device 10, irrespective of the sliding length of the slide operation performed on the marker (e.g., distance from the position A3 to the position A4 in FIG. 9). However, different markers MK may be displayed, depending on the length of the slide operation. For example, when the slide length is equal to or shorter than a predetermined first length, the next marker MK located on the opposite side in the direction of the slide operation, defined here as first marker MK, may be displayed on the display device 10, and when the slide length is longer than the first length and equal to or shorter than a predetermined second length, a second marker MK, in other words the marker MK after the next marker MK, may be displayed on the display device 10.

Although the display apparatus according to the present invention is exemplified by the smartphone in the foregoing embodiment, the present invention is not limited thereto. For example, the display apparatus may be a mobile phone, a PDA, a music player, or an electronic tablet. Further, the display apparatus according to the present invention may be incorporated in an image forming apparatus (e.g., a multifunction peripheral, a copier, or the like) that forms an image on a recording medium (e.g., recording sheet). The document data may represent various other types of document, without limitation to the report, or a bookmark in which contact addresses or addresses of favorite web pages are listed.

Further, the configurations and processings described in the foregoing embodiments with reference to FIG. 1 to FIG. 15 are merely exemplary, and in no way intended to limit the present invention to those configurations and processings.

The invention claimed is:

1. A display apparatus comprising:
a display device;
a touch panel that detects a contact on the display device and a contact position, the touch panel being located on a front face of the display device;
a storage device in which document data is stored; and
a control device that includes a processor and, through the processor executing a control program, acts as:
an operation receiver that receives an instruction according to a touch operation performed on the display device and detected by the touch panel;
a display controller that causes the display device to display the document data stored in the storage device, when the operation receiver receives an instruction to display the document data:
a searcher that searches, when the operation receiver receives an input of a character to search, the document data displayed on the display device for a target character that accords with the character to search; and
a marker display controller that displays a marker on a position corresponding to the target character detected by the searcher,
wherein the display controller (i) causes the display device, when the operation receiver receives an instruction based on a slide operation, performed on the marker displayed on the display device and detected by the touch panel, to display a next marker located on an opposite side, in a direction of the slide operation, and (ii) causes the display device, when the operation receiver receives an instruction based on a slide operation, performed on a position other than the marker displayed on the display device and detected by the touch panel, to scroll a screen on the display device in the direction of the slide operation,
wherein the control device further acts as an operation assisting region display controller that causes the display device to display an operation assisting region of a predetermined size larger than a region of the target character, and surrounding the region of the target character larger, when the target character detected by the searcher is composed by only a single character, or when the region of the target character is smaller than a predetermined threshold,
wherein the display controller (i) causes the display device, when the operation receiver receives the instruction based on the slide operation, performed on the operation assisting region displayed on the display device and detected by the touch panel, to display the next marker located on the opposite side in the direction of the slide operation, and (ii) causes the display device, when the operation receiver receives the instruction based on the slide operation, performed on a position other than the operation assisting region displayed on the display device and detected by the touch panel, to scroll the screen on the display device in the direction of the slide operation,
wherein, when the target character detected by the searcher is composed by only a single character, the operation assisting region display controller causes the display device to display the operation assisting region, formed as a circular region including the target character at the center, and having a diameter corresponding to a length of a plurality of characters,
wherein, when the region of the target character detected by the searcher is smaller than a predetermined square region which is the predetermined threshold, the operation assisting region display controller causes the display device to display the operation assisting region formed as a circular region having a diameter which is integer multiple of a length of a side of the predetermined square region or as a square region each side of which has a length which is integer multiple of the length of the side of the predetermined square region.

2. The display apparatus according to claim 1,
wherein the control device further acts as:
a scroll bar display controller that displays, when the document data is larger than the screen of the display device, a scroll bar indicating, by a position thereof in the screen of the display device, which part of an entirety of the document data a portion being displayed on the screen of the display device corresponds to; and
an identifier that identifies a position on the scroll bar corresponding to a position of the target character detected by the searcher,
wherein the display controller displays a mark indicating presence of the target character, at the position on the scroll bar identified by the identifier.

3. The display apparatus according to claim 2,
wherein, when the operation receiver receives an instruction to move to a position corresponding to a position of the mark, according to detection by the touch panel that the mark displayed on the scroll bar has been touched, the display controller causes the display device to display the marker at the position corresponding to the position of the mark.

4. The display apparatus according to claim 1,
wherein the display controller (iii) causes the display device, when the operation receiver receives an instruction based on a double slide operation, performed by touching the marker and a position other than the marker on the display device, and then sliding therefrom, and simultaneously detected by the touch panel, to display an extreme-end marker, located at an extreme end of one or a plurality of markers located on the opposite side in the direction of the double slide operation.

5. The display apparatus according to claim 1, wherein the marker display controller changes a color of the target character to a color dissimilar to a color of the marker, when the color of the target character is similar to the color of the marker.

6. The display apparatus according to claim 1, wherein the display controller (i) causes the display device, when the operation receiver receives the instruction based on the slide operation, performed on the marker displayed on the display device and detected by the touch panel, to display the next marker located on the opposite side in the direction of the slide operation, when a slide length of the slide operation performed on the marker is equal to or shorter than a predetermined first length, and to display a marker after the next marker located on the opposite side in the direction of the slide operation, when the slide length of the slide operation performed on the marker is longer than the first length and equal to or shorter than a predetermined second length.

\* \* \* \* \*